United States Patent [19]

Natori

[11] Patent Number: 4,655,022
[45] Date of Patent: Apr. 7, 1987

[54] JOINTED EXTENDIBLE TRUSS BEAM

[75] Inventor: Michihiro Natori, Tokyo, Japan

[73] Assignee: Japan Aircraft Mfg. Co., Ltd., Yokohama, Japan

[21] Appl. No.: 752,445

[22] Filed: Jul. 5, 1985

[30] Foreign Application Priority Data

Jul. 12, 1984 [JP] Japan ............................ 59-145136

[51] Int. Cl.[4] ........................................... E04H 12/18
[52] U.S. Cl. ............................ 52/646; 52/108; 52/117; 52/DIG. 10
[58] Field of Search ............... 52/108, 646, DIG. 10, 52/109, 116–121, 111, 113, 648, 654, 655, 632, 637

[56] References Cited

U.S. PATENT DOCUMENTS

| 3,486,279 | 12/1969 | Webb ............................... 52/108 |
| 3,496,687 | 2/1970 | Greenberg et al. ................. 52/109 |
| 3,771,274 | 11/1973 | Vaughan .......................... 52/646 |
| 3,783,573 | 1/1974 | Vaughan .......................... 52/646 |
| 4,017,932 | 4/1977 | Lotto et al. ..................... 52/646 X |
| 4,334,391 | 6/1982 | Hedgepeth et al. ................ 52/108 |
| 4,337,560 | 7/1982 | Slysh ............................. 52/646 X |
| 4,480,415 | 11/1984 | Truss ............................. 52/108 |
| 4,539,786 | 9/1985 | Nelson ........................... 52/646 X |
| 4,557,097 | 12/1985 | Mikulas, Jr. et al. .............. 52/646 |

OTHER PUBLICATIONS

Development of Deployable Structure for Large Space Platform Systems (Part 1 Report) by R. L. Cox and R. A. Nelson—Oct. 1982, NASA-CR-17690.
Development of Deployable Structure of Large Space Platform Systems (Interim Report vol. I) Aug. 1982, NASA-CR-170689.
Stacbeam: "An Efficient, Low-Mass, Sequentially Deployable Structure", Adams, Intersociety Energy Conversion Eng. Conf. 1982, vol. 3, 1578–1583.

Primary Examiner—William F. Pate, III
Assistant Examiner—Rich Chilcot, Jr.
Attorney, Agent, or Firm—Frishauf, Holtz, Goodman & Woodward

[57] ABSTRACT

A plurality of beams or triangular plates members and beam members form a tetrahedral unit. These units are coupled at their common planes to adjacent facing units to form a foldable, extendible truss beam. Some of the beams are extendible or bendable. By extending or bending, each beam or plate member folds into a flat or bar shape.

22 Claims, 41 Drawing Figures

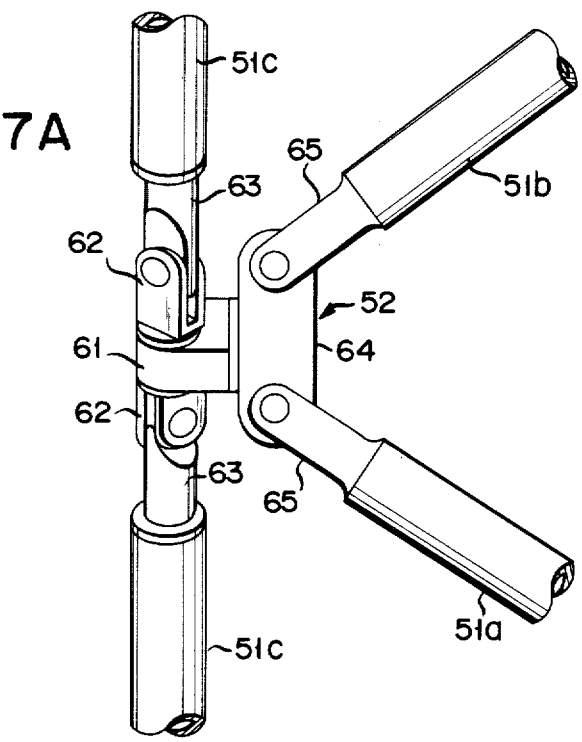
F I G. 7A
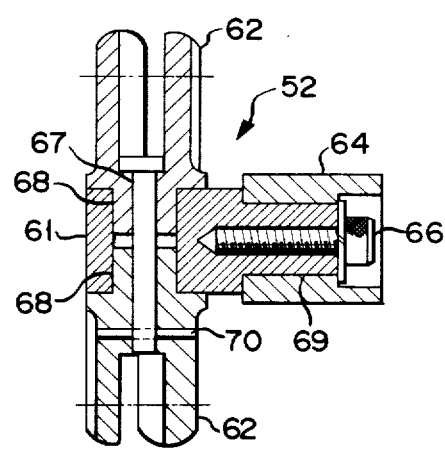
F I G. 7B

JOINTED EXTENDIBLE TRUSS BEAM

BACKGROUND OF THE INVENTION

This invention relates to jointed extendible truss beams which form an elongated truss structure when unfolded and occupy little space when folded.

Structures which are similar to this kind of truss beam are very widely used. The requirements for this kind of structure, particularly for use in space, is that it be light, rigid and fold into a small space for transportation.

Examples of prior art extendible truss structures are the so-called simplex mast disclosed in U.S. Pat. No. 3,486,279 and the STACBEAM disclosed in IECEC-829260, "An Efficient Low-Mass, Sequentially Deployable Structure" Adams, Intersociety Energy Conversion Eng. Conf. 1982, Vol. 3, 1578–1583. The simplex mast is a nearly perfect, extremely simplified, extendible truss beam. One part of the structural elements of this beam includes a tensile cable. This is different in concept from the jointed extendible truss beam of this invention, and is not suitable for large structures requiring strength and rigidity.

The STACBEAM is a jointed extendible truss beam formed entirely of beam elements. A joint is provided in the central portion of these beams for folding and the beams parallel to the lengthwise truss beams, which are the main load bearing members, are also foldable in the center section. The total number of beams that bend in the middle represents 2/3 of the total number of beams. Also, the number of joints is up to three times the minimum number required to construct the truss structure. Including the mechanism for locking the joints themselves, complicated devices sufficiently capable of bearing the load are required.

Truss beams, which are a basic structural element of space structures, must be carried into space by transportation vehicles such as rockets or the space shuttle. The first consideration in setting up large structures in space is the efficient use of storage and the greatest possible reduction in weight.

The beams making up the truss beam can be made light using composite materials, for example, but it is difficult to reduce the weight of the joints and locking mechanisms. Also, when the truss beam is folded, these joints and locking mechanisms interfere with each other and represent a major difficulty in designing stage for making the most efficient use of storage space.

In consideration of these points, the structural concept of present day jointed extendible truss beams having many joints and locking members is being restudied with a view to major reductions in weight and simplification of design by reducing the number of these joints and locking members. These truss beams are structures as well as a kind of mechanism, which, including the joints and locking members, have very many parts. Structures which have very many parts, particularly when they are to be used in space, require adjustment and checks in order to guarantee high reliability, which results in greatly inflated costs. Proposals for solving these problems are greatly sought, and the object of this invention is to respond to this need.

SUMMARY OF THE INVENTION

The object of the invention is to provide a jointed extendible truss beam, in which a tetrahedron having six beams, or two triangular plates and one beam, and at least four joints are rotatably coupled with the beams, forms one unit, one triangular plane of this tetrahedron is commonly coupled with the next tetrahedron to form a truss beam, and the length of each beam of the tetrahedral unit, which has at least one locking mechanism, is telescopic for varying the length to form a jointed extendible truss beam in which the tetrahedrons fold sequentially in a plane.

Another object of the invention is to provide a jointed extendible truss beam, in which a tetrahedron having six beams and at least four joints rotatably coupled with the beams, forms one unit, one triangular plane of this tetrahedron is commonly coupled with the next tetrahedron to form a truss beam, and at least one of the five beams that are not in the longitudinal direction of the truss beam and that has a locking mechanism, has a joint in the middle of the beam for folding the beam, and depending on the shape of the tetrahedron, one beam is telescopic such that by contracting, the tetrahedron sequentially folds up.

BRIEF DESCRIPTION OF THE DRAWINGS

This invention may be better understood with reference to the drawings in which:

FIG. 7A is a view of FIG. 7 along the arrow 7A—7A;

FIG. 7B is a view of FIG. 7 along the arrow 7B—7B;

DETAILED DESCRIPTION OF THE PREFERRED EMBODIMENTS

The structure of the invention will be described in conjunction with the drawings.

Figure 1:
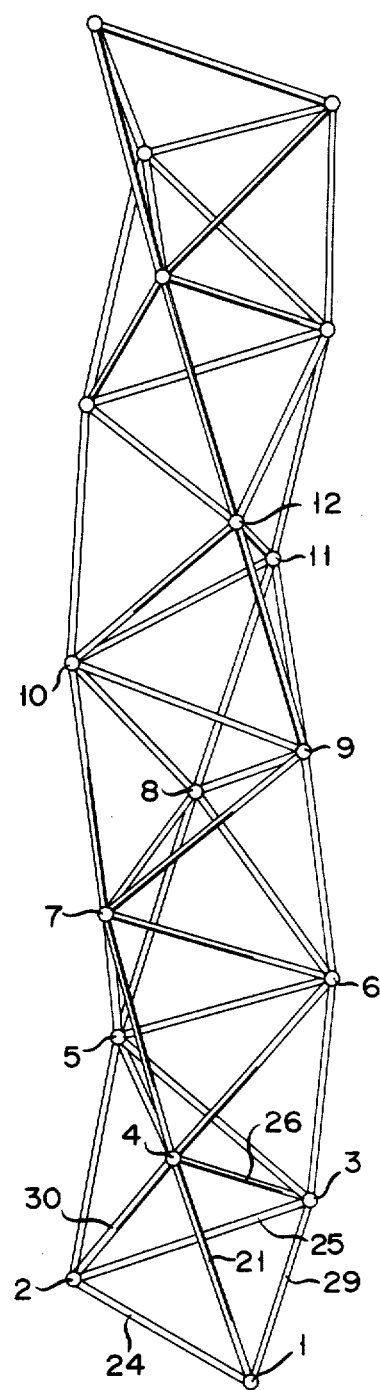
FIG. 1 shows the structure of the truss beam according to the first embodiment of the invention.

FIG. 1 shows the truss beam constructed by sequentially coupling regular tetrahedrons formed of six beams. In the drawing, reference numerals 1, 2, . . . , 12 denote joints. When viewed overall, this truss beam appears to be constructed of a number of helical lines. There are three kinds of helices: three large-pitch helices (members constituting these helices are called longitudinal members and are arranged along the length of the truss beam) are formed by lines connecting joints 1, 4, 7, 10, . . . , joints 2, 5, 8, 11, . . . , and joints 3, 6, 9, 12, . . . , in the order named; one small-pitch helix (members constituting this helix are called helical members) is formed by a line connecting joints 1, 2, 3, 4, 5, 6, . . . , in the order named; and two medium-pitch helices (members constituting these helices are called angle members) are formed by lines connecting joints 1, 3, 5, 7, 9, 11, . . . , and joints 2, 4, 6, 8, 10, 12, . . . One tetrahedron (formed, for example, by joints 1, 2, 3 and 4 as the apexes) is constructed of one longitudinal member 21, three helical members 24, 25, 26, and two angle members 29, 30. A minimum unit of the truss beam can be considered to be three tetrahedrons which include three longitudinal members (namely, the part formed by joints 1, 2, 3, 4, 5 and 6). The lower plane of the truss beam, i.e., the triangle formed by apexes 1, 2, 3, is generally not perpendicular to the length of the truss beam.

Figure 2:
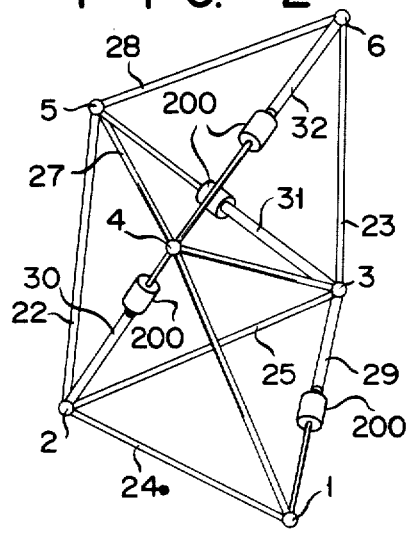
FIG. 2 is a perspective view of a minimum unit of the structure shown in FIG. 1.
Figure 2A:
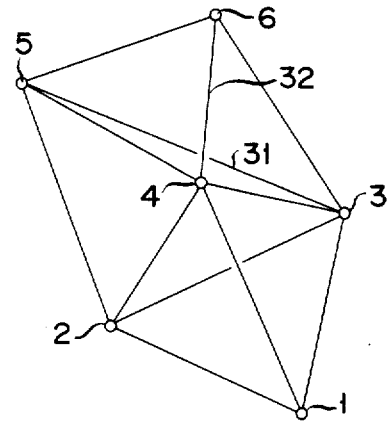
FIGS. 2A, 2B, 2C, 2D and 2E are perspective line drawings showing the folding order of the minimum units.
Figure 2B:
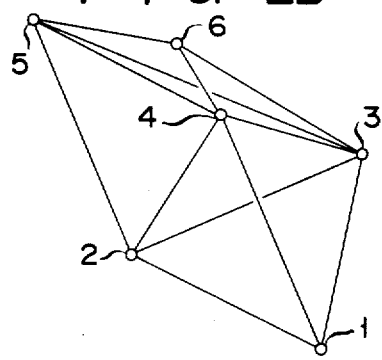
Figure 2C:
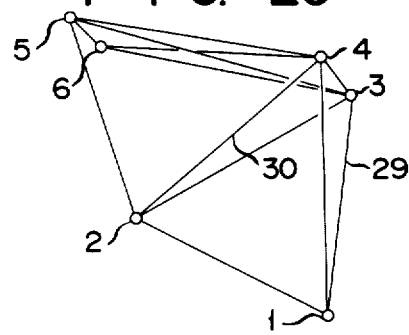
Figure 2D:
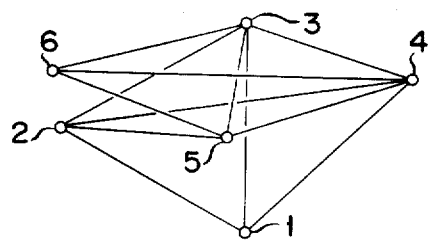
Figure 2E:
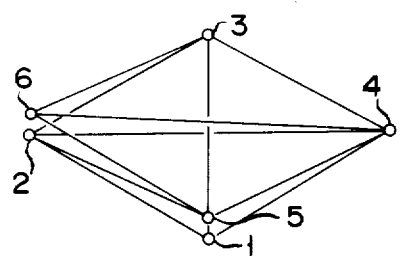

To understand the extension or folding mechanism of the entire truss beam it is sufficient to describe the folding mechanism of the minimum unit. FIG. 2 shows a part constructed of joints 1, 2, 3, 4, 5 and 6, i.e., a minimum unit. FIG. 2A shows the state in which the tetrahedron formed by joints 3, 4, 5 and 6 is partially folded by the simultaneous extension of angle members 31 and 32, and FIG. 2B shows the tetrahedron fully folded. In FIG. 2B, joint 6 is on the same plane as the triangular plane having its apexes formed by joints 3, 4 and 5. FIG. 2C shows the minimum unit being further folded by the extension of angle members 29 and 30. FIG. 2D shows angle members 29 and 30 extended still further and FIG. 2E shows the minimum unit almost fully folded. As is clear from FIG. 2E, joint 5 is folded on top of joint 1 and joint 6 is folded on top of joint 2. By extending four angle members, it is possible to fold the minimum unit flat, and when viewed at an angle from above, the tetrahedron has become a square with the sides of the tetrahedron forming the sides of the square. This minimum unit has suitable locking mechanisms for when it is extended such as mechanism 200 depicted schematically only in FIG. 2 but equally usable with the other embodiments.

Figure 3:
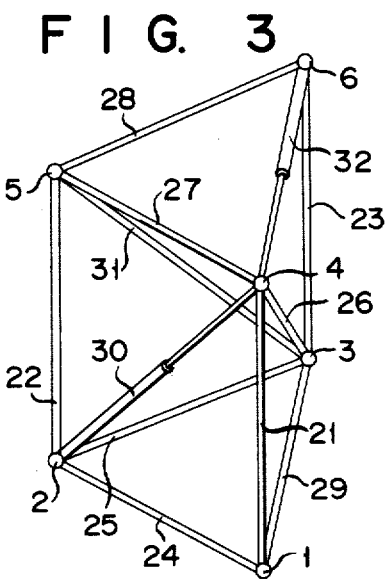
FIG. 3 is a perspective view of a vertical minimum unit of the second embodiment of the invention.

FIG. 3 shows the tetrahedron of FIG. 2 in which angle members 29, 30, 31 and 32 have been lengthened simultaneously by 1.155, resulting in the helical pitch of the three longitudinal members becoming infinite and the direction of the longitudinal members coming exactly into line with the lengthwise direction of the truss beam. This kind of minimum unit is called a vertical minimum unit.

By coupling there vertical minimum units it is possible to form a truss beam in which the longitudinal members are completely straight. The end planes of the minimum unit, i.e., the triangles formed by joints 1, 2, 3 and joints 4, 5, 6 as the apexes, are inclined at a fixed angle in the lengthwise direction of the truss beam. There is essentially no difference in the folding of the vertical minimum unit and the tetrahedral minimum unit of FIG. 2.

In the series of FIGS. 2 to 2E the folding states obtained by the extension of four longitudinal members of the minimum unit are shown. Next will be shown the folding states of the vertical minimum unit of FIG. 3 by the extension of only two angle members. It is of course possible to also fold the minimum unit shown in FIG. 2 by the extension of the two angle members, and to fold the minimum unit shown in FIG. 3 by the extension of four angle members.

Figure 3A:
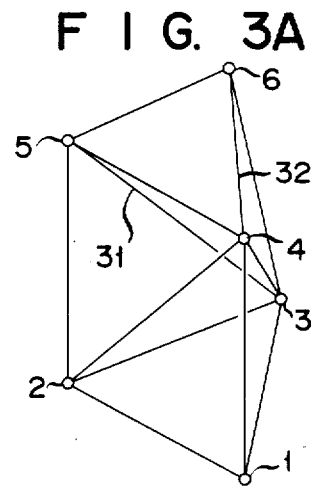
FIGS. 3A, 3B, 3C, 3D and 3E are perspective line drawings showing the folding order of the vertical minimum units.
Figure 3B:
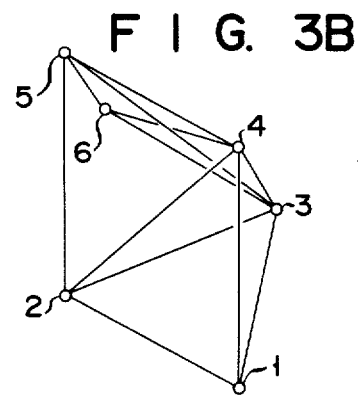
Figure 3C:
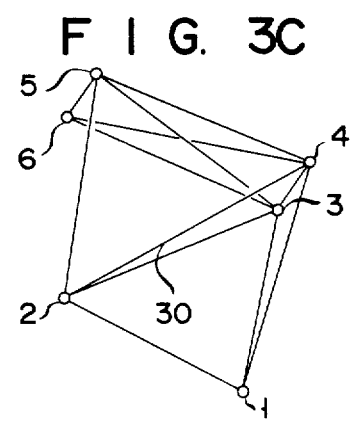
Figure 3D:
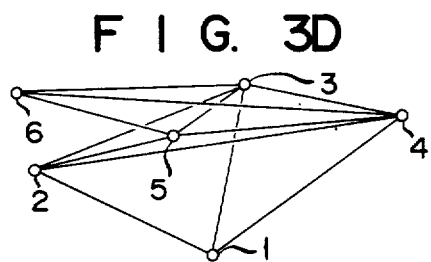
Figure 3E:
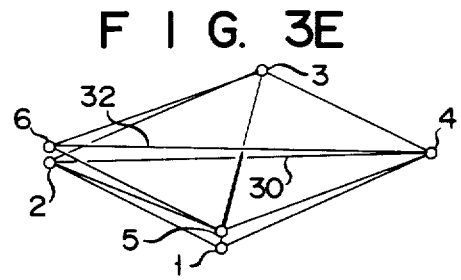

FIG. 3A shows exactly the same two bottom tetrahedrons shown in FIG. 3 formed by joints 1, 2, 3, 4, 5 with only angle member 32 extended. FIG. 3B shows the topmost tetrahedron folded in with joint 6 on the same plane as the triangle formed with joints 3, 4 and 5 as the apexes. FIG. 3C shows only the angle member 30 slightly extended with the bottom two tetrahedrons folded simultaneously. When angle member 30 is extended further, the tetrahedron folds further (FIG. 3D) until it is almost flat (FIG. 3E).

In this case, only the lengths of angle members 30 and 32 have varied from that in the extended state shown in FIG. 3, and the folded form is diamond shaped. With the method of folding the minimum unit by extending only two of the angle members, the planes of the extended minimum unit are maintained as compared to when four angle members are extended. Namely, as can be seen in FIG. 3E, the five triangles whose apexes are formed by joints 1, 2 and 3, joints 2, 4 and 1, joints 3, 4 and 5, joints 3, 5, and 2, and joints 3, 5 and 6, do not vary at all. It is therefore possible to form these portions of plates. The operation of the joints is also very straightforward and designing the joints is very easy.

Figure 4:
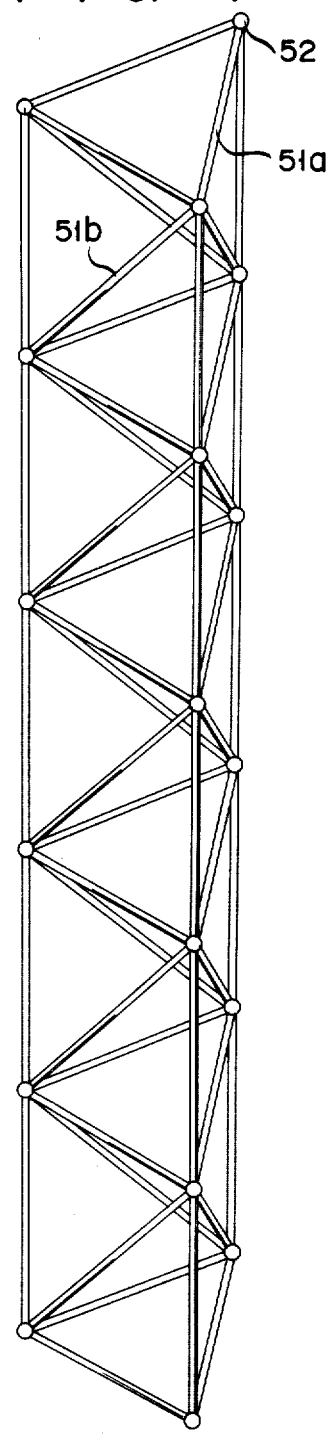
FIG. 4 is a perspective view of the truss beam structure assembled of the vertical minimum units.

FIG. 4 shows the truss beam, which is formed by successively coupling the vertical minimum units shown in FIG. 3, as it looks when extended from a flat diamond shape by the extension of two telescopic angle members of the minimum units. Reference numerals 51a and 51b denote the two telescopic extendible angle members that have locking mechanisms. These are the only beam members which have mechanisms for folding. The minimum unit is comprised of twelve beams of which three are common to the next minimum unit, so the total number of beam members which have mechanisms for folding is approximately 2/9 of the total number of beams, which is a great reduction over prior art jointed extendible truss beams.

Reference numeral 52 denotes one kind of joint. These joints are arranged at the minimum number of connections required to construct the truss structures. The folding movement of the beams is also comparatively simple so the joints are easy to design. Also, what should be noted is that both ends of the truss beam, when extended, are perpendicular to the lengthwise direction of the truss beam.

The embodiment of FIG. 3, in which the four angle members of the minimum unit of FIG. 3 are telescopically extended and the minimum unit is folded into a flat square shape, has the same shape as that shown in FIG. 4 when extended. In this case, the number of beam members having folding mechanisms is twice that of the embodiment shown in FIG. 4, which, in turn makes it possible to obtain a wide variety of extension directions and speeds simply by suitably controlling the length of the beam member when extending.

Figure 5:
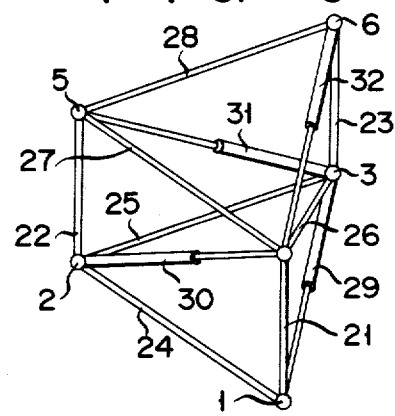
FIG. 5 is a perspective view of another minimum unit in which the longitudinal member has been shortened.

FIG. 5 shows the vertical minimum unit of FIG. 3 with the three longitudinal members simultaneously shortened. The angle members have a length 1.718 that of the longitudinal members. A mast that is constructed of successively coupled minimum units having shortened longitudinal members close together is very resistant to flexion and deflection loads.

Figure 5A:
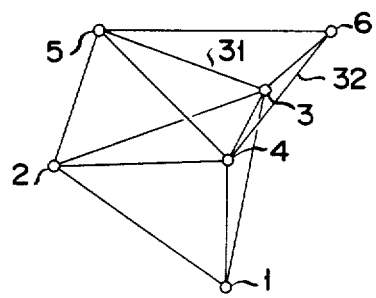
FIGS. 5A, 5B, 5C, and 5D are perspective line drawings showing the folding order of the vertical minimum units of FIG. 4.
Figure 5B:
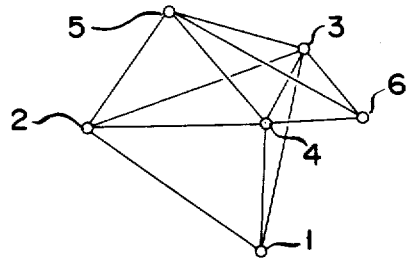
Figure 5C:
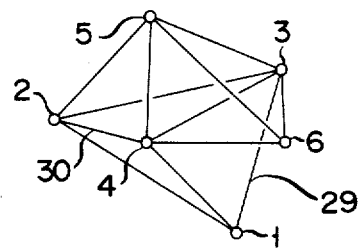
Figure 5D:
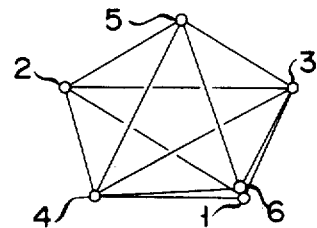
Figure 5E:
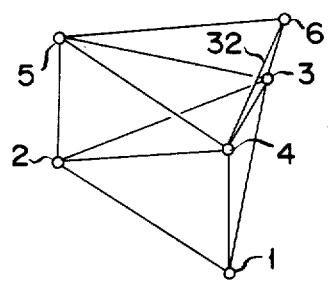
FIGS. 5E, 5F, 5G and 5H are perspective line drawings showing another folding order of the vertical minimum units of FIG. 4.

The following is a description of the folding of such a vertical minimum unit by contracting the angle members. First, contraction of the four angle members is shown. FIG. 5A shows the angle members 31 and 32 simultaneously contracted, and FIG. 5B shows the topmost tetrahedron folded in with joint 6 on the same plane as the triangle which has joints 3, 4 and 5 as its apexes. FIG. 5C next shows the angle members 29 and 30 simultaneously contracted, and FIG. 5D shows joint 6 on top of joint 1, forming a minimum unit that is folded flat.

Figure 5F:
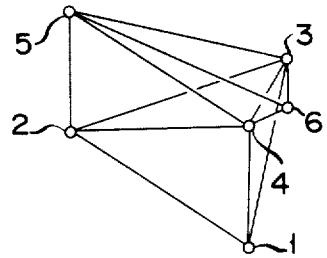
Figure 5G:
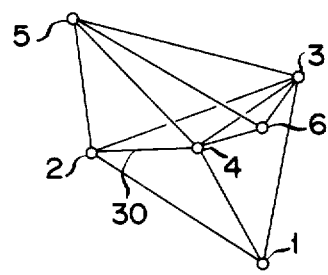
Figure 5H:
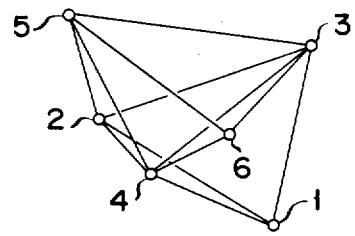

The following drawings show the case where only two angle members of the minimum unit are contracted. FIG. 5F shows the minimum unit of FIG. 5 with only angle member 32 contracted. In this case the bottom two tetrahedrons do not vary. FIG. 5F shows the top tetrahedron folded in with joints 6 on the same plane as the triangle which has joints 3, 4 and 5 as its apexes. FIG. 5G next shows angle member 30 contracted and the bottom two tetrahedrons folded in. In this case the bottom plane of the triangle whose apexes are formed by joints 1, 2 and 3 does not vary. FIG. 5H shows the minimum unit folded flat.

With a truss beam that is constructed by successively coupling these vertical minimum units, the odd numbered joints come on top of the circle circumscribing the triangle whose apexes are formed by joints 1, 3 and 5, and the even numbered joints come on top of the circle circumscribing the triangle whose apexes are formed by joints 2, 4 and 6. With this kind of method in which the minimum unit is folded by contracting only two angle members, it is possible to use plates for the five triangles, which remain the same, as was similarly described in reference to FIG. 3E, and the design of the joints is simplified. These drawings show the telescopic contraction of the angle members. However, it is also possible to obtain the same effect by providing joints in the middle of the angle members so that they can bend.

Figure 6:
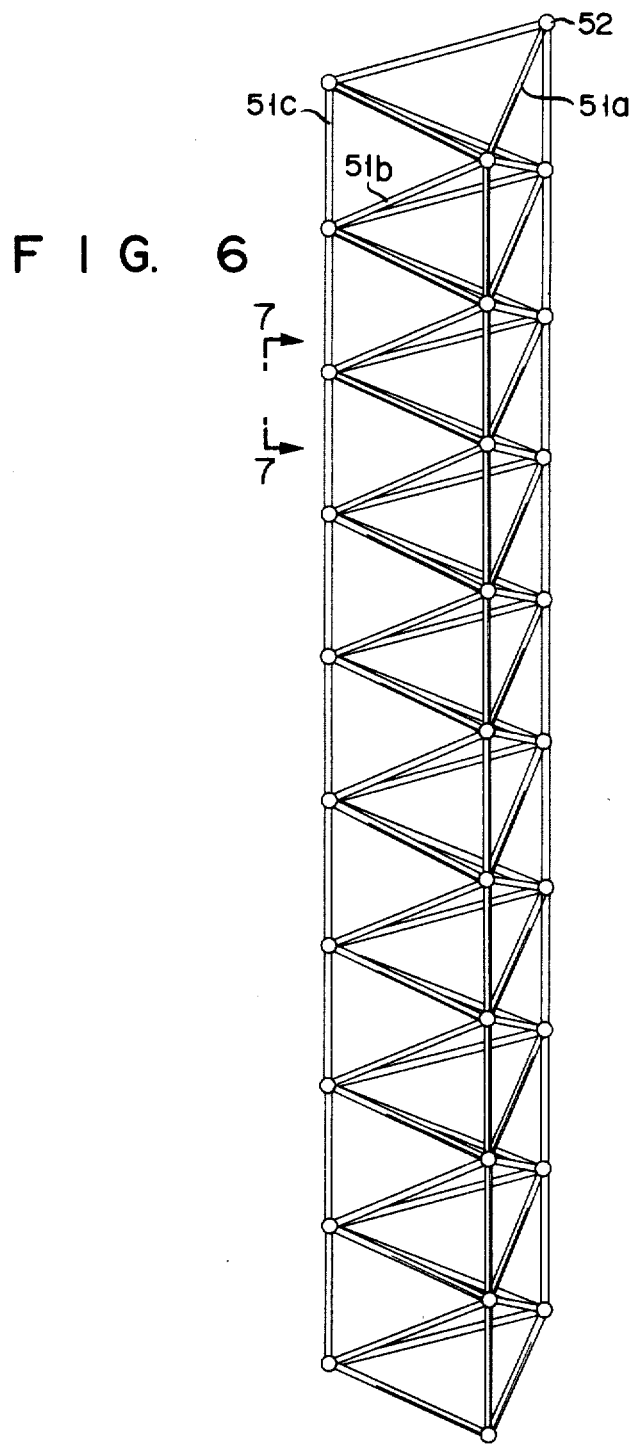
FIG. 6 is a perspective view of the truss beam structure assembled of the vertical minimum units.

FIG. 6 shows an extended truss beam of this embodiment in which the vertical minimum units shown in FIG. 5 are successively coupled. The helical and angle members are arranged close together so this truss beam is resistant to flexion and deflection. When the folding in is carried out by telescopically extending or contracting two or four angle members of the minimum unit, or when it is carried out by bending the joints provided in the middle of the angle members, load bearing capacity, storage efficiency and cost can be selected as required to meet various design requirements. With this embodiment it is also possible to lengthen the longitudinal members to form vertical minimum members which are narrower and longer than that shown in FIG. 3 but which fold in the same way.

Figure 7:
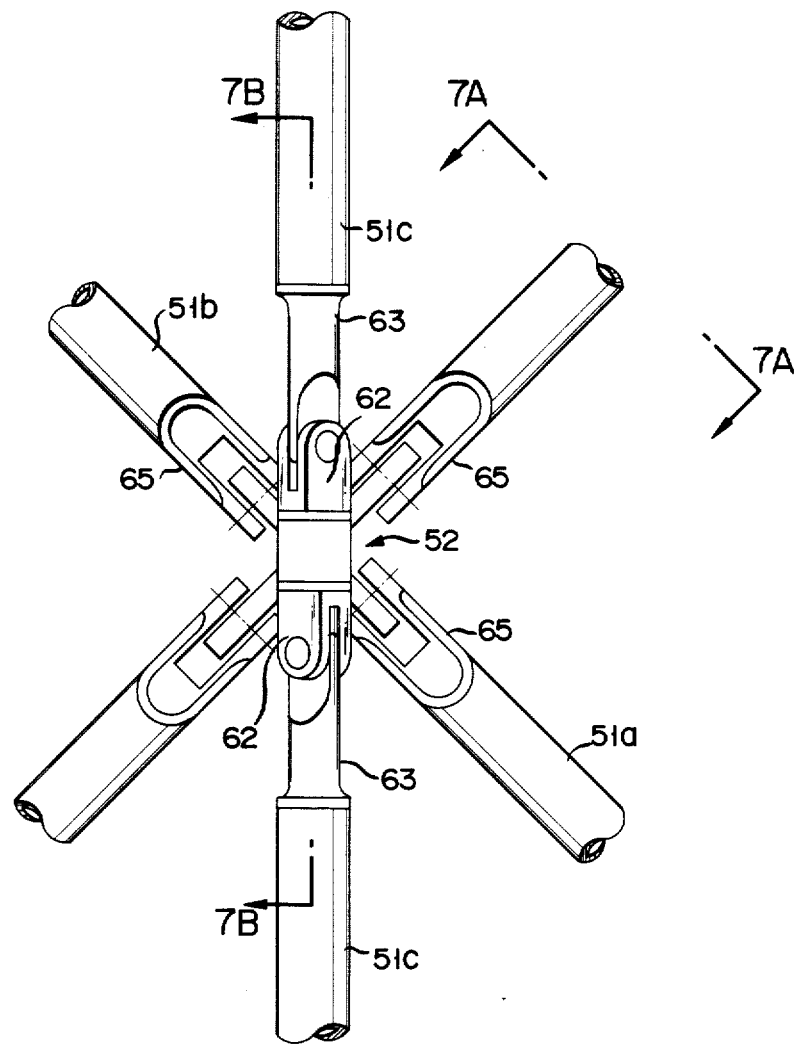
FIG. 7 shows the hinge structure of the frame of FIG. 6 in the direction of the arrow 7—7.

FIGS. 7 to 7B show the structure of hinge 52, which is used in this truss beam. Hinge 52 has a hinge body 61 to which forks 62 are rotatably attached. Shafts 68, which have a circular cross section, are formed on the base section of the forks 62. Shafts 68 are rotatably fitted into hinge body 61. Forks 62 are fixed by bolt 67 and pin 70 which pass through the forks. Longitudinal members 51c are rotatably connected to rod ends 63 which are connected to forks 62. Rotating member 64 is rotatably fitted into shaft 69, which protrudes from hinge body 61, to which member 64 is fixed by bolt 66. Angle members 51a, 51b are rotatably connected to forked rod ends 65 which are connected to rotating member 64.

Figure 8:
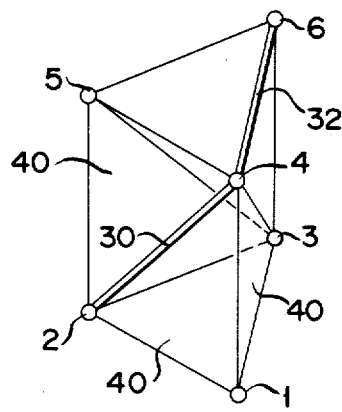
FIG. 8 is a perspective view of an embodiment in which part of one plane of the tetrahedron is missing.
Figure 8A:
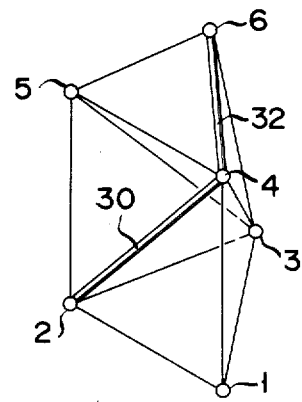
FIGS. 8A, 8B, 8C, 8D, 8E are perspective views showing the folding order.
Figure 8B:
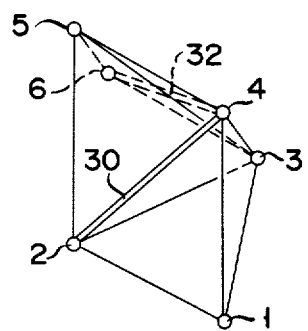
Figure 8C:
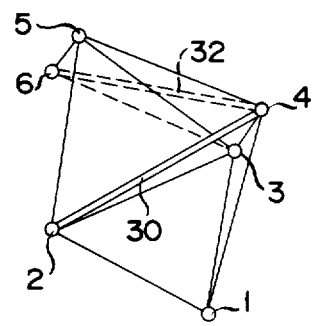
Figure 8D:
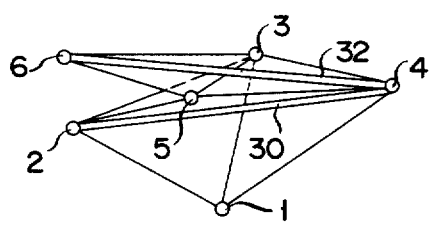
Figure 8E:
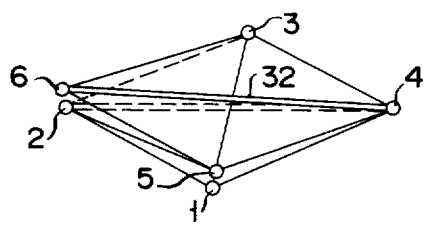

FIG. 8 shows an embodiment in which part of each plane of the tetrahedron of FIG. 5 has been replaced with a plate. In this embodiment, the planes of the triangles formed by hinges 1, 2 and 3, hinges 1,3 and 4, hinges 2, 3 and 5, hinges 3, 4 and 5, and hinges 3, 5 and 6 have been replaced with plate material 40. Reference numerals 30, 32 denote beam members. FIGS. 8A to 8E show the folding sequence of the embodiment of the FIG. 8. The extending sequence is the opposite of the folding sequence.

Figure 9:
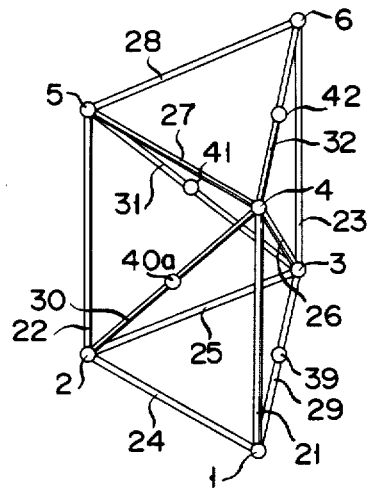
FIG. 9 is a perspective view of an embodiment in which midway joints are provided.
Figure 9A:
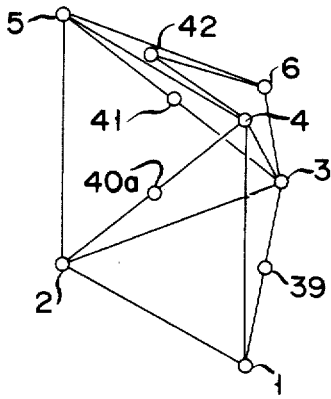
FIGS. 9A, 9B, 9C, 9D show the folding order of the embodiment shown in FIG. 9.
Figure 9B:
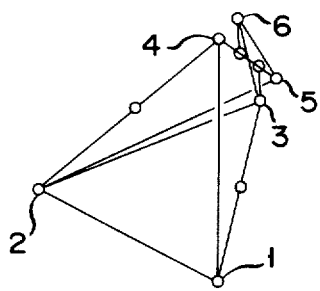
Figure 9C:
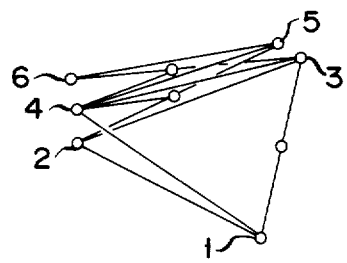
Figure 9D:
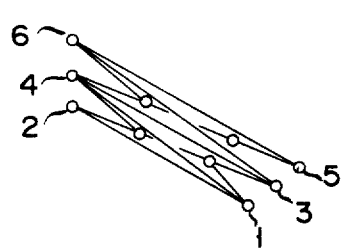

The following is a description of an embodiment in which beam members having joints in the middle are used for bending. FIG. 9 shows the same minimum unit shown in FIG. 3 except that joints are provided in the middle of the angle members for bending. These joints are fastened to the angle members with suitable fastening mechanisms. In FIG. 9, reference numerals 39, 40a and 41 denote these midway joints. With this vertical minimum unit, the length of the eight members other than the angle members is the same. In this embodiment, the folding order is sequentially shown in FIGS. 9A to 9D. When angle member 32 bends at midway joint 42, joint 6 folds onto joint 4, and the tetrahedron whose apexes are formed by joints 3, 4, 5 and 6 is folded up. In other words, longitudinal member 23 stacks onto helical member 26 and helical member 28 stacks onto helical member 27. As the members, of course, have a certain thickness, the joints are correspondingly offset. No members are stacked on to angle member 31 so if this angle member is next bent at midway joint 41, joint 5 will be stacked on joint 3, and the tetrahedron whose apexes are formed by joints 2, 3 and 4 is folded.

In this way, when angle member 30 and finally angle member 29 are folded, the minimum unit is folded into a bar shape at the location of helical member 24. In actual practice, by taking the offset required into consideration when designing the joints, it is possible to form the members, which are closely packed when folded and stored, of plates such that members extend at right angles, or to form the members of tubes such that they expand at right angles. When folded in this way, the storage efficiency is extremely high and it is possible to fold the tetrahedrons sequentially from the top, making both extension and storage very simple. Furthermore, it is possible to fold the unit with no joints being provided in the middle of the longitudinal members or the main load bearing members, which are features that are greatly desirable in future large spacecraft structures.

Figure 10:
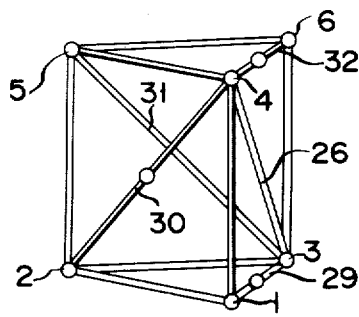
FIG. 10 is a perspective view of another embodiment in which midway joints are provided.

FIG. 10 shows a variation in the vertical minimum unit in which both end planes of the triangle are right triangles and are perpendicular to the lengthwise direction of the truss beam. The reference numbers of the joints and members are the same as that used up to now. The difference between this variant minimum unit and those considered up to now lies in helical member 26 being longer than the other four members, which have equal lengths, and angle members 30, 31 being equal in length but longer than equal-length angle members 29 and 32.

In the folding process of this kind of minimum unit, helical member 26 becomes equal in length to the other four helical members, and the length of the angle members of different length varies suitably or the midway joints bend suitably so that the minimum unit folds up in the same way as the previously described minimum units do. In this case, as well, it is not necessary to provide joints in the middle of the longitudinal members.

Consider, for example, the minimum unit shown in FIG. 10 being folded into the bar shape described earlier. In this case, joints are provided in the middle of the four angle members so that the bending of these members is exactly the same as was described earlier, i.e., the longitudinal members and the equal-length helical members become equal in length. First, the tetrahedron whose apexes are formed by joints 3, 4, 5 and 6 contracts simultaneously with the bending in the middle of angle member 32 such that helical member 26 expands telescopically to become equal in length to the other helical members. In this way, it is possible for joint 6 to stack onto joint 1, and the angle members to bend in the middle in the sequence 31, 30 and then 29.

Figure 11:
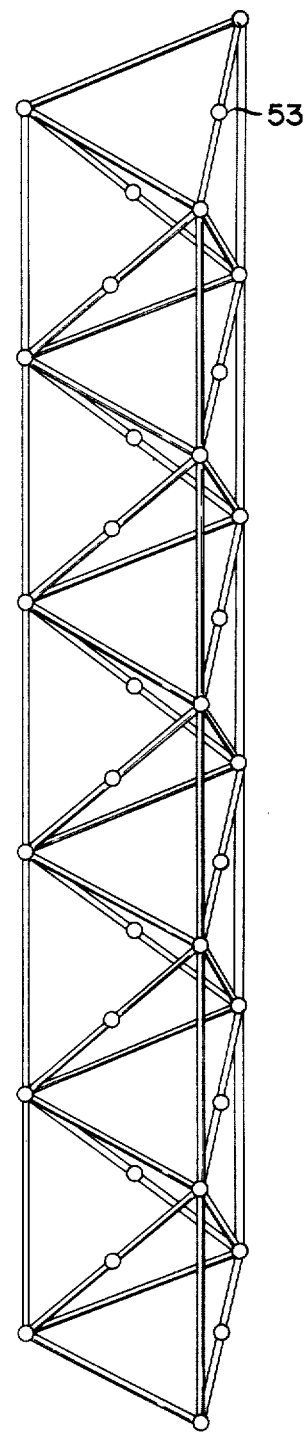
FIGS. 11 and 12 are perspective views of the truss beams assembled of the minimum units of FIGS. 9 and 10.

FIG. 11 shows an extended truss beam constructed of vertical minimum units, which have midway joints and are successively coupled together. Midway joint 53 provided in the angle member is one such joint. As was described in detail earlier, when the angle members bend sequentially at these joints, all the members fold into a bar shape at the helical member. In actual practice, because design consideration must be given to the offset of the joints, it is possible to make the beam members of plates or tubes which are tightly packed together, and to store the device in a suitable case for transportation into space.

Figure 12:
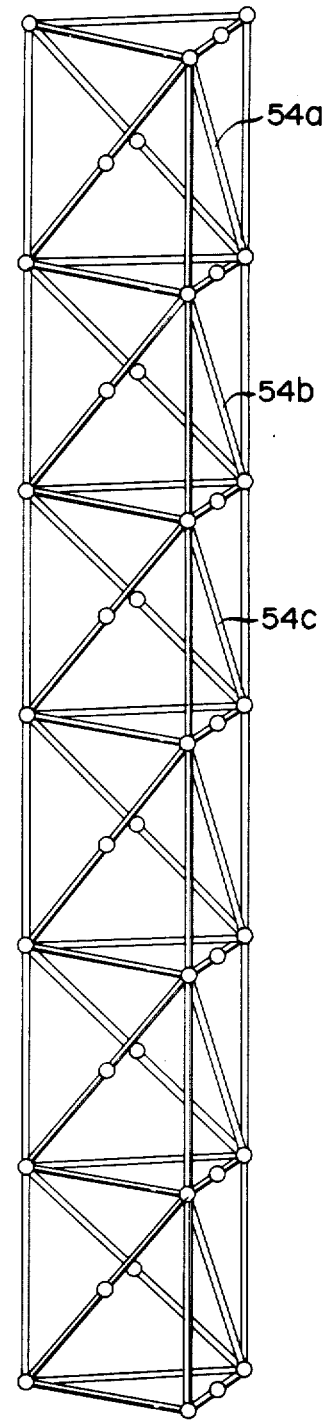

FIG. 12 shows an extended truss beam constructed of the variant minimum units. In this case, both end planes of the truss beam and the triangles corresponding to both end planes of the minimum unit are all perpendicular to the lengthwise direction of the truss beam. In this embodiment, when beam members 54a, 54b and 54c, etc., which are angled and which constitute one side plane of a triangular truss beam, are folded, they must telescopically contract to the same length as the beams which form the right triangle of the end plane. Simulate with the contraction movement of the beams, the length of the angle members is telescopically varied as was described with reference to FIG. 10, or midway joints are provided and the angle members bend, so that the truss beam according to this embodiment folds up.

The truss beam of these embodiments is divided into constant length sections which constitute one unit. The design of the coupling of a plurality of these units is also vary effective from the viewpoint of manufacturing and the restrictions imposed on the storage capacity for transportation.

With a truss beam constructed of tetrahedrons successively coupled together, and in which the length of the angle members is varied telescopically or the angle members are bent at the joints in the middle to perform the folding operation, very many advantages effects can be obtained.

First, compared to a prior art jointed extendible truss beam in which all the members except those in plane perpendicular to the lengthwise direction of the truss beam bend, with a truss beam of these embodiments the number of beams which have telescopic mechanisms or midway joints is greatly reduced. In the embodiment in which two angle members of the minimum unit are provided with a folding mechanism, the number of such mechanism-equipped beams is approximately 2/9 of the total number of beams. Also, the design of such joints is extremely simple. These features mean that the weight of the device is, of course, reduced, and the cost of the parts, the adjustment and inspection can be greatly reduced. Also, because the amount of adjustment required is reduced, it is possible to manufacture a product having high reliablity.

Secondly, storage efficiency is high. Of course, when the truss beam is folded into a bar shape, and when the truss beam is folded into a flat shape as well, the base area of the planar shape is at most double the cross-sectional area of the extended truss beam. The rigidity of the extended truss beam is proportional the diameter of the beam to a power of 4.

Truss beams having a large diameter are essential structural elements of large spacecraft and so the suitable truss beams have been desired. The truss beam of this invention is in response to this demand and the truss beam of this invention which folds into a bar shape, in particular, has a very large diameter when extended. If full use is made in the lengthwise direction of the cargo bay of the space shuttle, it is possible to make a large truss beam having a diameter of 19 meters using helical members that are 15 meters long. This kind of a large truss beam has long been desired, but up to the present time, only assembled truss beams of that size have been built. The assembly of this kind of truss beam outside the spacecraft by astronauts has involved many difficult engineering problems. Therefore, an extendible truss beam that has good storage efficiency has a great advantage as a structural part of a large spacecraft.

According to this invention, no more elements are added to the prior art device, rather the number of elements are reduced, making the structure simple, the requirements mentioned earlier are met sufficiently, resulting in a truss beam that is superior to the prior art device in many points.

What is claimed is:

1. A jointed extendible truss beam comprising a plurality of tetrahedrons each having six bars and four joints rotatably coupled with the bars to form one unit, only one triangular plane of each of the tetrahedrons being common between adjacent tetrahedrons to form said truss beam;
    each of said tetrahedrons has in a lengthwise direction of said truss beam at least one helical bar forming part of a smallest helical pitch, at least one angle bar forming part of a medium helical pitch, and at least one longitudinal bar forming part of a large helical pitch;
    at least one of the angle bars in each tetrahedron having an expansion/contraction means for varying its length and locking it into a designated length.

2. A jointed extendible truss beam according to claim 1, wherein said expansion/contraction means is located substantially at the center of said angle bar.

3. A jointed extendible truss beam according to claim 1, wherein each tetrahedron includes two angle bars with only one of said angle bars in each tetrahedron having said expansion/contraction means.

4. A jointed extendible truss beam according to claim 1, wherein each tetrahedron includes two of said angle bars with both having said expansion/contraction means.

5. A jointed extendible truss beam according to claim 1, wherein the angle bars are 1.155 times longer than the other bars in each tetrahedron.

6. A jointed extendible truss beam according to claim 1, wherein the angle bars are 1.718 times the length of other bars in each tetrahedron, and the longitudinal bars being substantially parallel to the lengthwise direction of the truss beam.

7. A jointed extendible truss beam according to claim 3, wherein the angle bars are 1.155 times longer than the other bars in each tetrahedron.

8. A jointed extendible truss beam according to claim 4, wherein the angle bars are 1.155 times longer than the other bars in each tetrahedron.

9. A jointed extendible truss beam according to claim 3, wherein the angle bars are 1.718 times the length of other bars in each tetrahedron, and the longitudinal bars being substantially parallel to the lengthwise direction of the truss beam.

10. A jointed extendible truss beam according to claim 4, wherein the angle bars are 1.718 times the length of other bars in each tetrahedron, and the longitudinal bars being substantially parallel to the lengthwise direction of the truss beam.

11. A jointed extendible truss beam comprising a plurality of tetrahedrons each having six bars and four joints rotatably coupled with the bars to form one unit, only one triangular plane of each of the tetrahedrons being common between adjacent tetrahedrons to form said truss beam;
each of said tetrahedrons having one longitudinal bar forming a part of only one tetrahedron, two angle bars each of which is shared by two tetrahedrons adjacent to each other, and three helical bars each of which is shared by three tetrahedrons adjacent to each other;
at least one of the angle bars in each tetrahedron having an expansion/contraction means for varying its length and locking it into a designated length.

12. A jointed extendible truss beam according to claim 11, wherein said expansion/contraction means is located substantially at the center of said angle bar.

13. A jointed extendible truss beam according to claim 11, wherein only one of said angle bars in each tetrahedron has said expansion/contraction means.

14. A jointed extendible truss beam according to claim 11, wherein two of said angle bars in each tetrahedron have said expansion/contraction means.

15. A jointed extendible truss beam according to claim 11, wherein the angle bars are 1.155 times longer than the other bars in each tetrahedron.

16. A jointed extendible truss beam according to claim 11, wherein the angle bars are 1.718 times the length of other bars in each tetrahedron, and the longitudinal bars being substantially parallel to the lengthwise direction of the truss beam.

17. A jointed extendible truss beam according to claim 13, wherein the angle bars are 1.155 times longer than the other bars in each tetrahedron.

18. A jointed extendible truss beam according to claim 14, wherein the angle bars are 1.155 times longer than the other bars in each tetrahedron.

19. A jointed extendible truss beam according to claim 13, wherein the angle bars are 1.718 times the length of other bars in each tetrahedron, and the longitudinal bars being substantially parallel to the lengthwise direction of the truss beam.

20. A jointed extendible truss beam according to claim 14, wherein the angle bars are 1.718 times the length of other bars in each tetrahedron, and the longitudinal bars being substantially parallel to the lengthwise direction of the truss beam.

21. A jointed extendible truss beam comprising a plurality of tetrahedrons each having six bars and four joints rotatably coupled with the bars to form one unit, only one triangular plane of each of the tetrahedrons being common between adjacent tetrahedrons to form said truss beam;
each of said tetrahedrons has in a lengthwise direction of said truss beam at least one helical bar forming part of a smallest helical pitch, at least one angle bar forming part of a medium helical pitch, and at least one longitudinal bar forming part of a large helical pitch;
at least one of the angle bars in each tetrahedron having at its center a joint means to fold the bar into a folded position and to lock it in an extended position.

22. A jointed extendible truss beam comprising a plurality of tetrahedrons each having six bars and four joints rotatably coupled with the bars to form one unit, only one triangular plane of each of the tetrahedrons being common between adjacent tetrahedrons to form said truss beam;
each of said tetrahedrons having one longitudinal bar forming a part of only one tetrahedron, two angle bars each of which is shared by two tetrahedrons adjacent to each other, and three helical bars each of which is shared by three tetrahedrons adjacent to each other;
at least one of the angle bars in each tetrahedron having at its center a joint means to fold the bar and to lock it in an extended position.

* * * * *

UNITED STATES PATENT AND TRADEMARK OFFICE
CERTIFICATE OF CORRECTION

PATENT NO. : 4,655,022
DATED : April 7, 1987
INVENTOR(S) : Michihiro Natori

It is certified that error appears in the above-identified patent and that said Letters Patent is hereby corrected as shown below:

On the title page

Under the heading "Assignee", after "Japan Aircraft Mfg. Co., Ltd, Yokohama, Japan", insert -- part interest --.

Signed and Sealed this

Fifth Day of July, 1988

*Attest:*

DONALD J. QUIGG

*Attesting Officer*   *Commissioner of Patents and Trademarks*